United States Patent [19]

Thaler

[11] Patent Number: 4,609,946
[45] Date of Patent: Sep. 2, 1986

[54] FACSIMILE APPARATUS AND DUPLICATOR

[75] Inventor: Michael R. Thaler, Cheshire, Conn.

[73] Assignee: Image Communications Inc., New Milford, Conn.

[21] Appl. No.: 657,916

[22] Filed: Oct. 5, 1984

Related U.S. Application Data

[62] Division of Ser. No. 390,210, Jun. 21, 1982, Pat. No. 4,476,496.

[51] Int. Cl.$^4$ .............................................. H04N 1/04
[52] U.S. Cl. ................................... 358/286; 358/293; 358/294
[58] Field of Search ............... 358/286, 293, 294, 296; 356/256

[56] References Cited

U.S. PATENT DOCUMENTS 3,502,814  3/1970  Salaman et al. ...................... 358/286
3,845,242  10/1974  Richeson, Jr. et al. .............. 358/256
4,414,579  11/1983  Dattilo et al. ......................... 358/86

FOREIGN PATENT DOCUMENTS 2082874  3/1982  United Kingdom ................ 358/286

Primary Examiner—James J. Groody
Assistant Examiner—Edward L. Coles
Attorney, Agent, or Firm—Pennie & Edmonds

[57] ABSTRACT

The present invention provides a multi-purpose facsimile machine which functions as either a telecopier or a photocopier, at the selection of the user. The machine, when used as a telecopier, eliminates synchronization of transmitting and receiving units by storing transmitted data in a memory prior to printing. The facsimile machine includes a linear motor for driving both a print head and scan head on a single block. The linear motor includes at least one electrical coil driven along at least one lateral guide member formed from interspersed magnetic and non-magnetic materials. By selectively energizing the coil, the motor is advanced along its guide member by magnetic interactions. The electrostatic print head of the facsimile machine includes at least one thin conductive wire fused into at least one glass casing for providing a solid block structure for protecting and supporting the wire.

4 Claims, 16 Drawing Figures

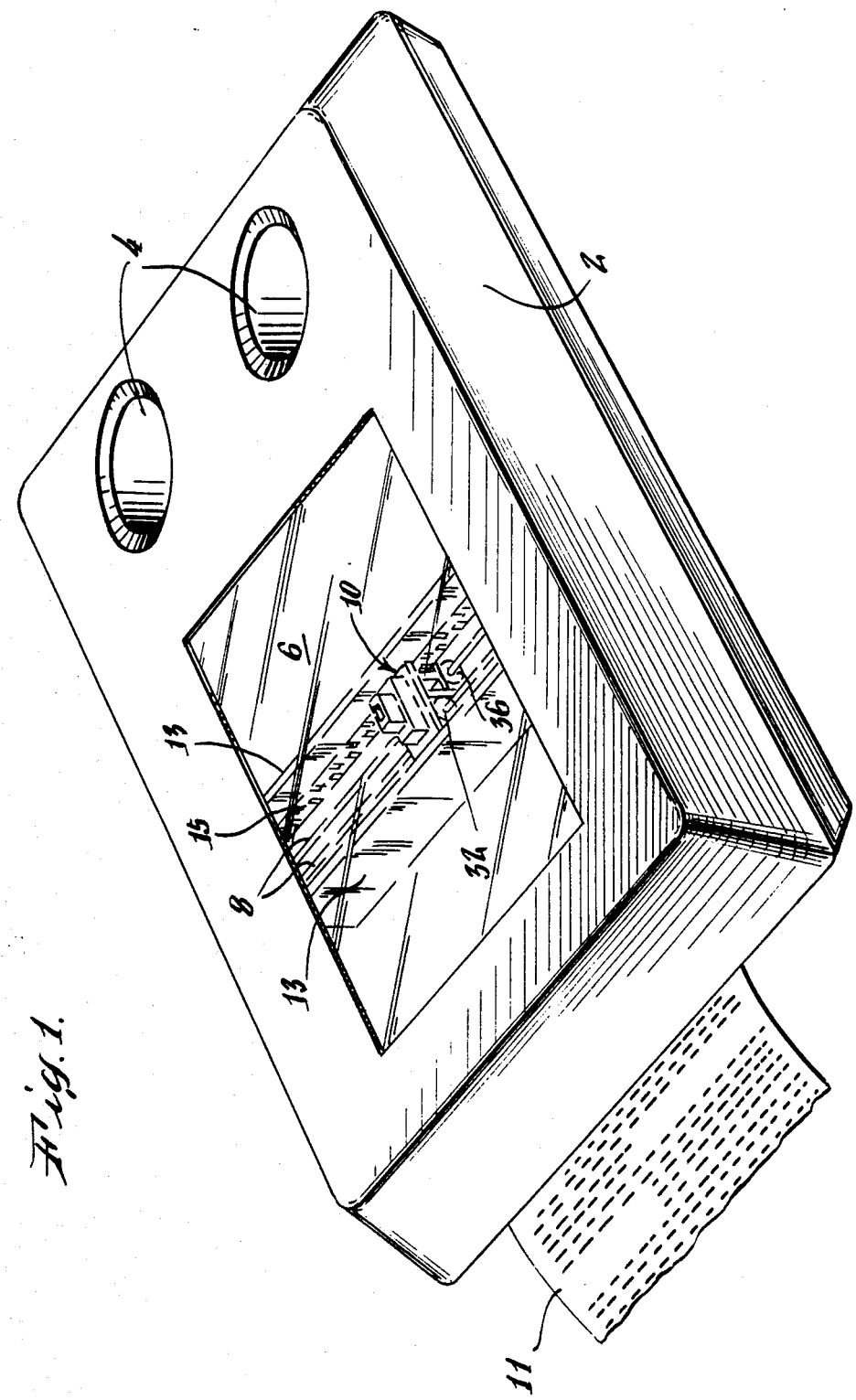

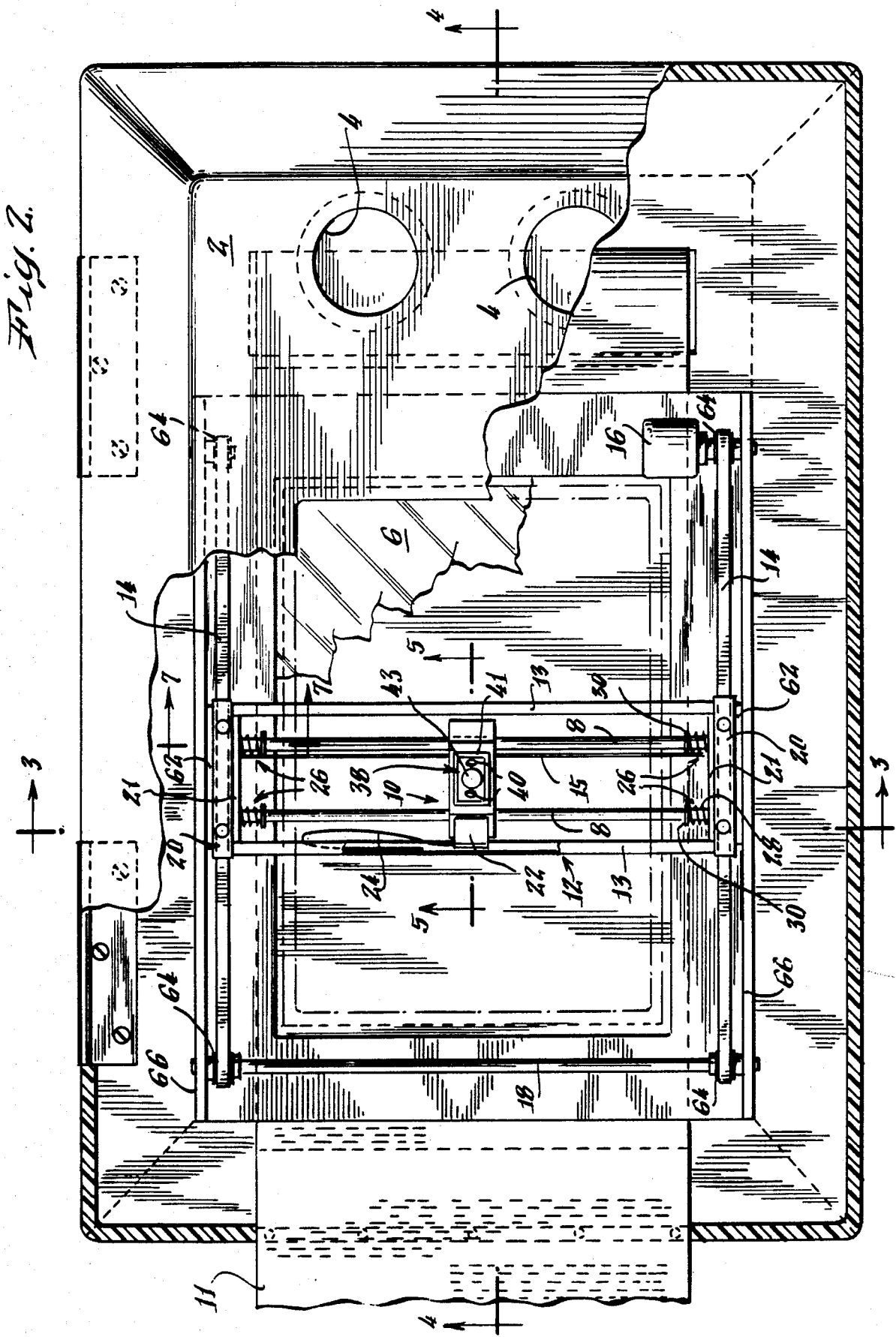

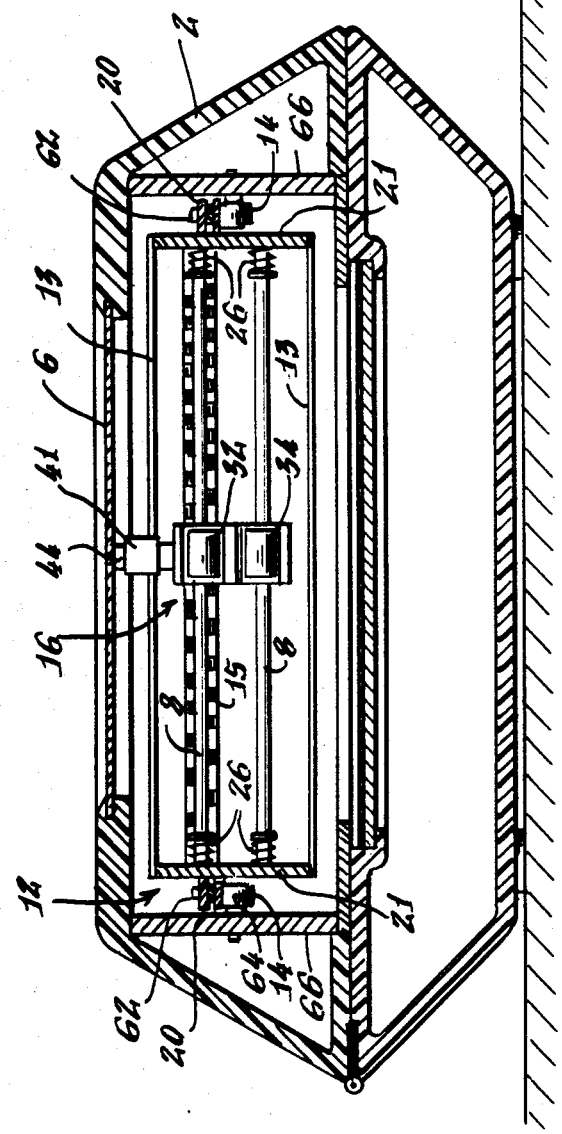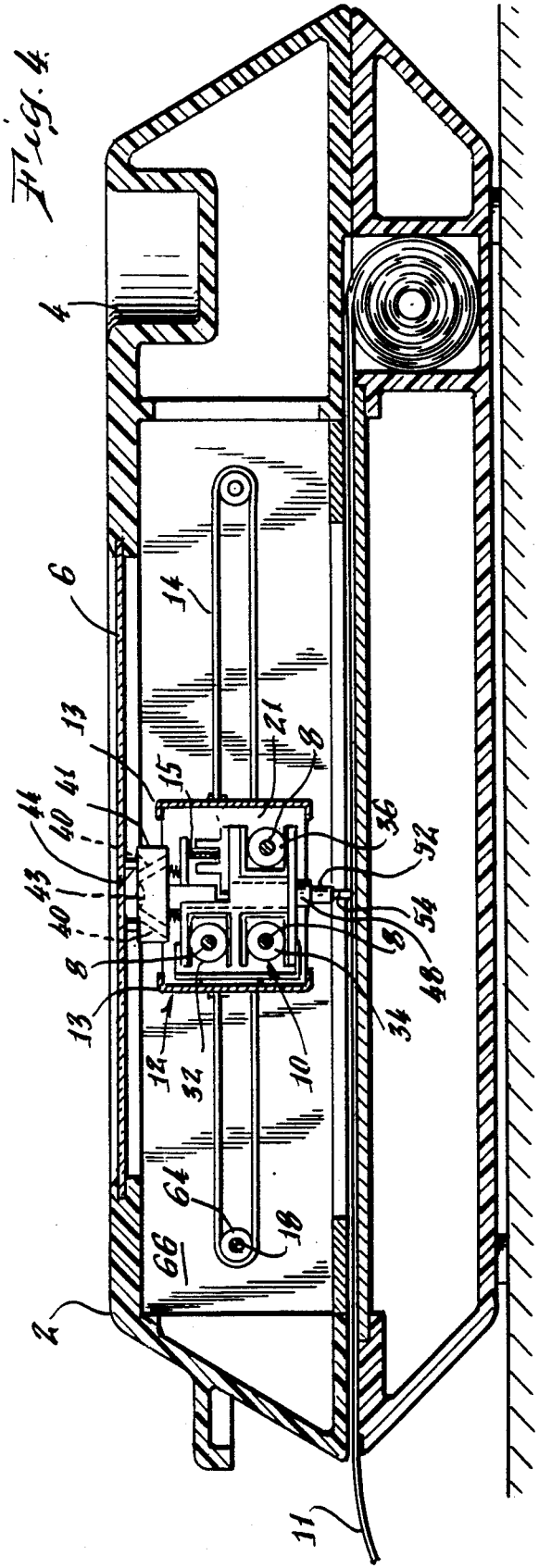

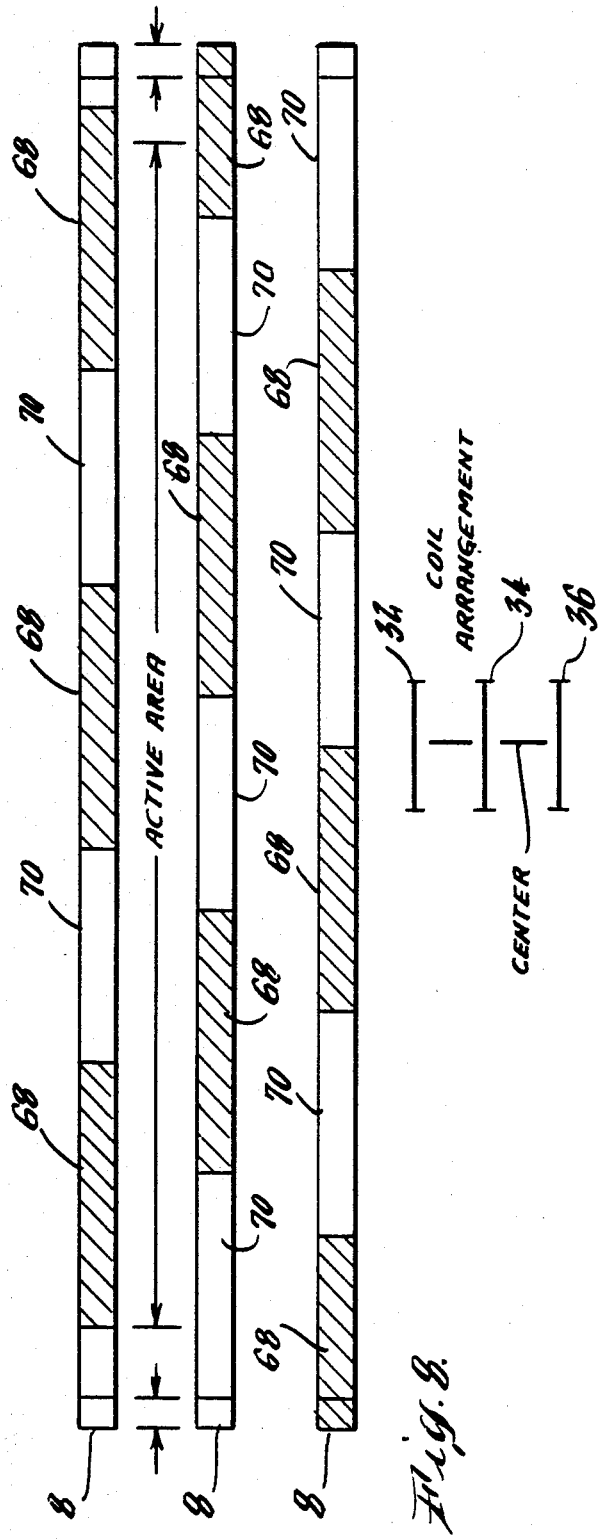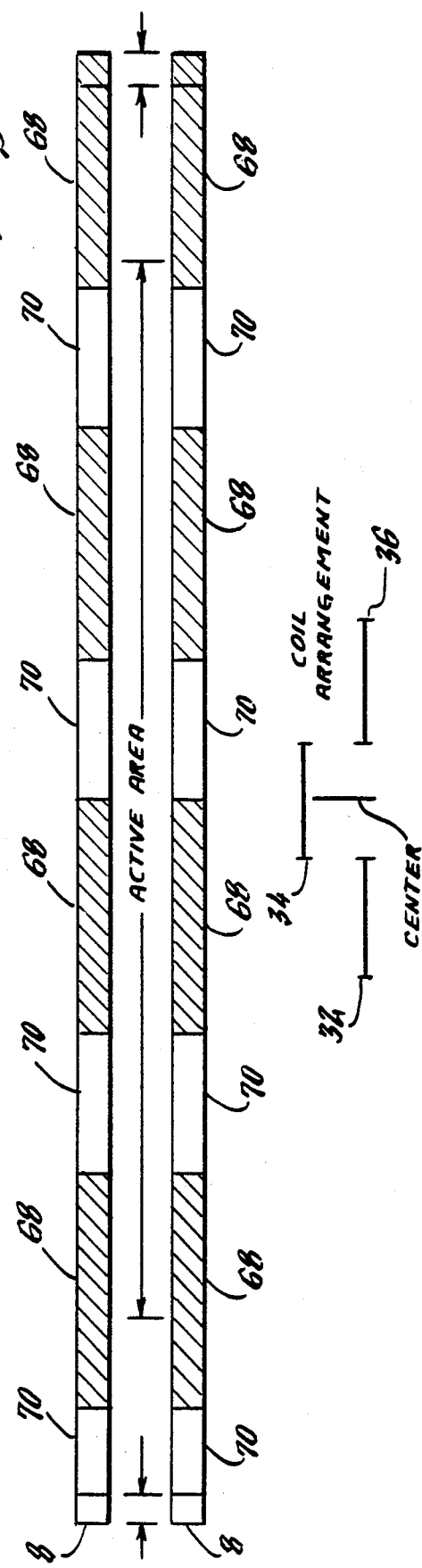

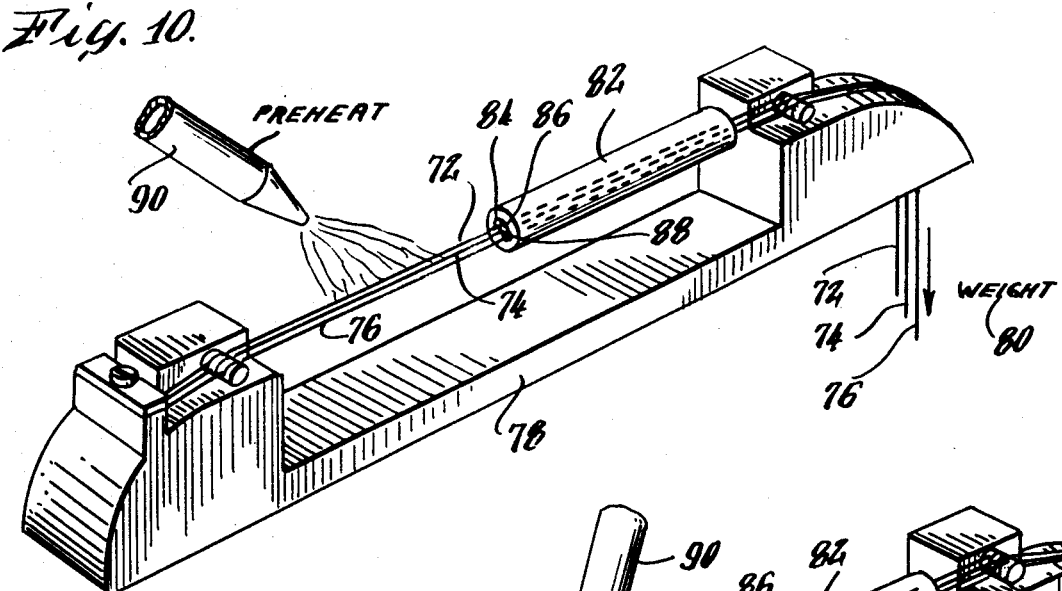
Fig. 10.
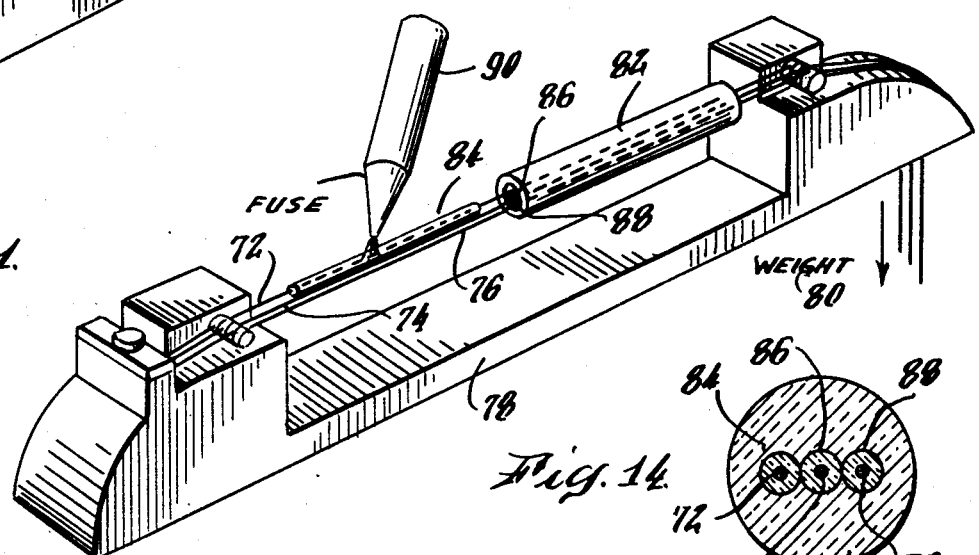
Fig. 11.
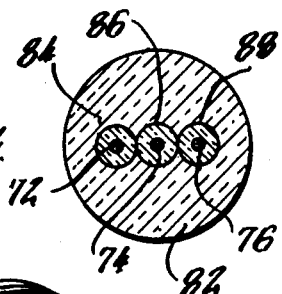
Fig. 14.
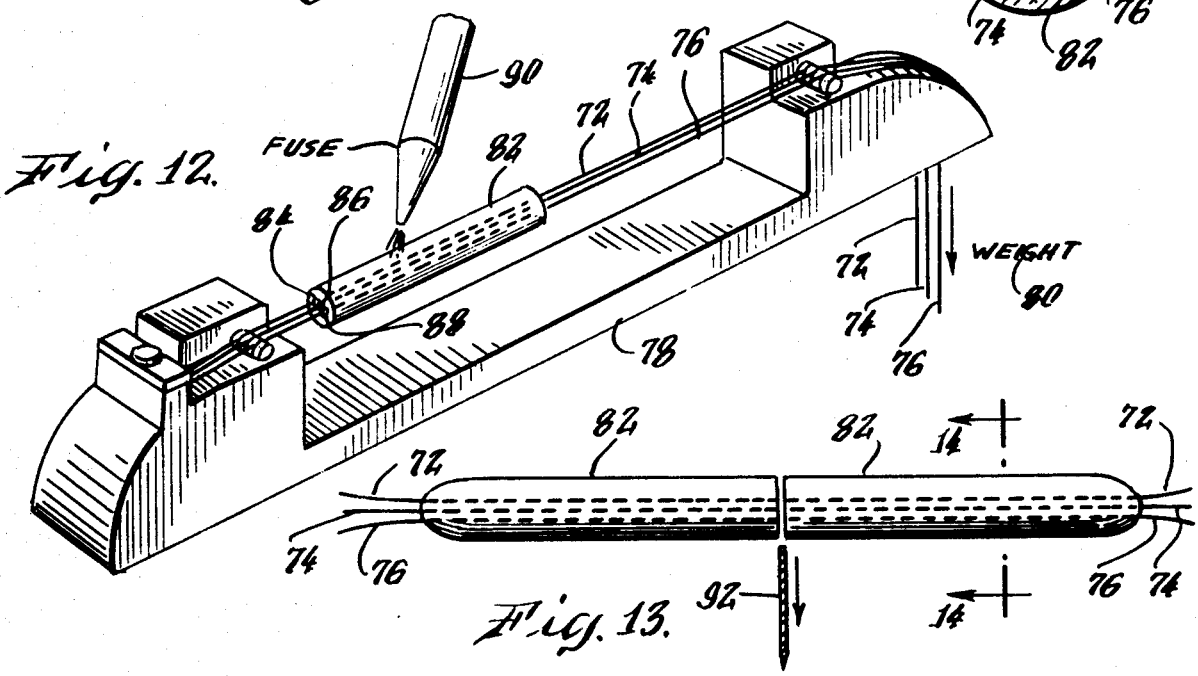
Fig. 12.
Fig. 13.

FACSIMILE APPARATUS AND DUPLICATOR

This is a division of application Ser. No. 390,210, filed June 21, 1982, now U.S. Pat. No. 4,476,496.

BACKGROUND OF THE INVENTION

Facsimile machines, such as telecopiers which are connected to standard telephone receivers for transmitting or receiving data over telephone lines, are generally known to the art. In the known machines, transmitting and receiving units must be synchronized to enable the receiver to print incoming data as it is received. Known telecopiers cannot be used as photocopying machines, and do not provide for simultaneous voice and data transmissions. The known telecopiers also use relatively complex, and thereby expensive motors, to drive their moving components, such as their print or scan heads. Electrostatic print heads used with telecopiers consist of relatively thick, unprotected free standing angled wires, which generally can print only in one direction and do not provide fine printing resolution.

SUMMARY OF THE INVENTION

The present invention overcomes the above-mentioned problems of the known facsimile machines by providing a multi-purpose facsimile machine which functions, at the selection of the user, as either a telecopier receiver or transmitter, or as a photocopier. Synchronization of the transmitter and receiver, when the machine is used as a telecopier, is eliminated by a memory storage device provided in the receiver which stores incoming data before printing. The facsimile machine enables simultaneous data and voice transmission by transmitting voice and data signals in two separate, mutually exclusive frequency bands.

In a further aspect of the invention, a linear motor, which can be used to drive the scan and print heads of the facsimile machine, includes at least one electrical coil mounted to a guide member. The guide member includes both magnetic and non-magnetic areas or inserts interspersed thereon in sections of predetermined length. By selectively energizing the electrical coil, the resultant magnetic interaction between the energized coil and the magnetic areas on the guide member, which act like a solenoid in reverse, advances the coil along the guide member.

In a further aspect of the invention, the linear motor is used to carry an electrostatic print head, stylus and scan head in a facsimile machine. The stylus of the print head is formed by a process in which a wire or plurality of wires are encapsulated into a single solid glass rod or block. The glass encased wires are rigidly supported so that thinner wires providing better quality printing may be used. The stylus may be used to print in both directions of movement of the motor, may be positioned vertically with respect to the paper to allow bi-directional printing and to avoid scratching the paper. The force of the wire is distributed over the larger bottom surface area of the glass encasement to prevent tearing of the paper by the wire.

BRIEF DESCRIPTION OF THE DRAWINGS

FIG. 1 of the drawings illustrates a perspective view of a facsimile machine in accordance with the present invention;

FIG. 2 illustrates a top plan view of the machine of FIG. 1, partly in section;

FIG. 3 is a sectional view of the machine taken along directional arrows 3—3 of FIG. 2;

FIG. 4 is a sectional view of the machine taken along directional arrows 4—4 of FIG. 2;

FIG. 8 is a diagram illustrating one possible arrangement of three lateral guide members and three corresponding coils for supporting and driving the linear motor of the facsimile machine of the present invention;

FIG. 9 is a diagram illustrating a second example of an arrangement of two lateral guide members and three coils for supporting and driving the linear motor of the facsimile machine of the present invention;

FIGS. 10-13 illustrate a method of producing a print head for the facsimile machine—or other printer, and FIG. 14 is a sectional view, taken along directional arrows 14—14 of FIG. 13, of a print head formed from the methods illustrated by FIGS. 10-13.

DESCRIPTION OF THE PREFERRED EMBODIMENTS

Figures 5, 5A:
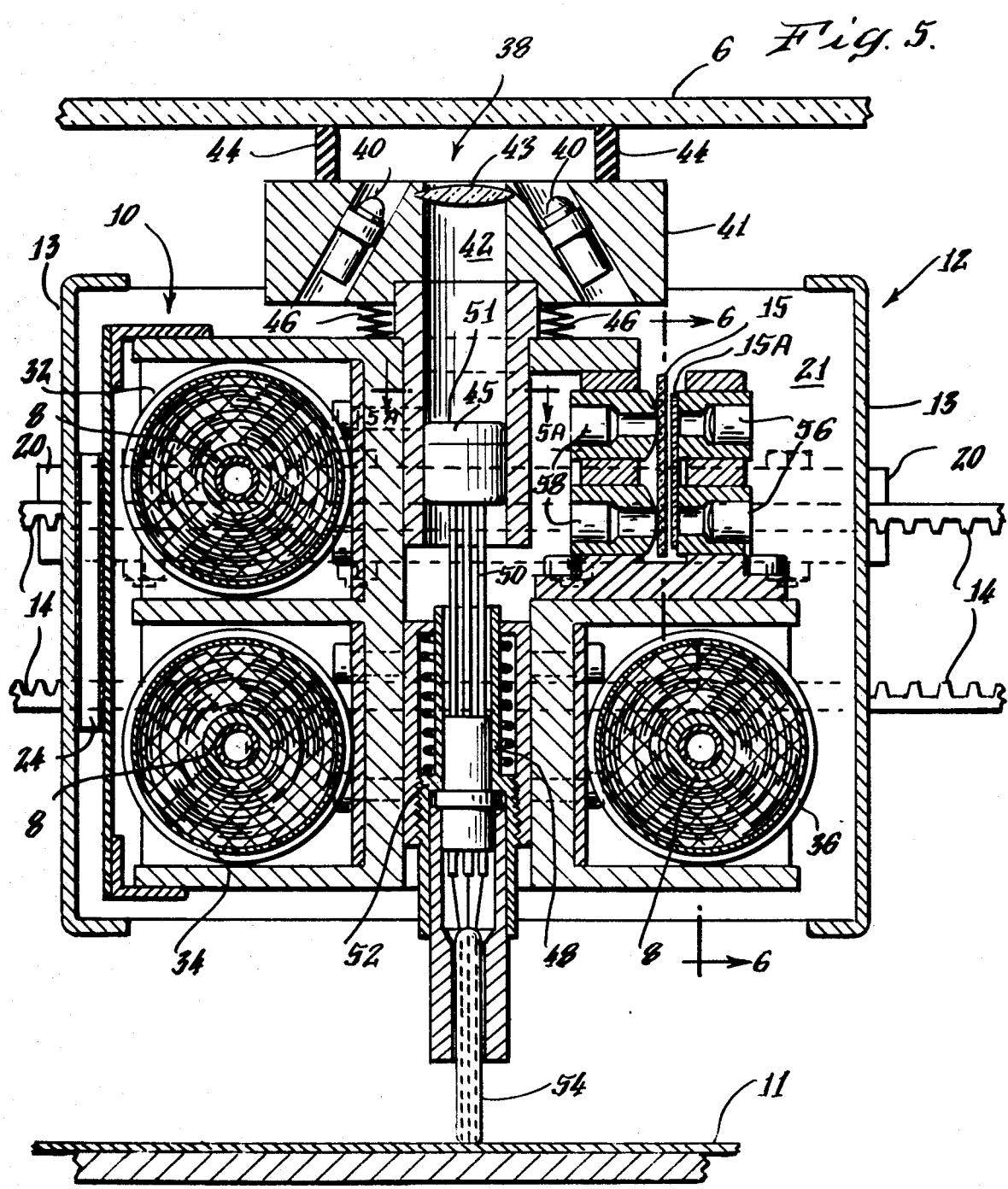
FIG. 5 is a sectional view taken along directional arrows 5—5 of FIG. 2.
FIG. 5A is a sectional view taken along directional arrows 5A—5A of FIG. 5.

FIGS. 1-7A of the drawings illustrate the preferred embodiment of a facsimile machine in accordance with the present invention; FIGS. 8-9 illustrate a linear motor used to drive the print head of the facsimile machine; and FIGS. 10-14 illustrate a method of manufacturing the print head used in the facsimile machine. As used herein, the facsimile machine may be a telecopier, a photocopier, or combination of both. For convenience, the following discussion of the drawings will be sub-divided into three separate sections entitled "Facsimile Machine", "Linear Motor" and "Print Head".

FACSIMILE MACHINE

The facsimile machine illustrated in FIGS. 1-7A is an apparatus for reproducing written documents. As will be developed herein, the device can function as a telecopier to either transmit or receive data through conventional telephone equipment, or it may be used as a standard office photocopier. The facsimile machine eliminates the need for synchronization of transmitting and receiving units when it is used as a telecopier, and also provides simultaneous transmission of data and voice signals. Moreover, complicated timing systems for scanning, printing and motor drive are eliminated by the machine.

FIG. 1 of the drawings illustrates a perspective view of the preferred embodiment of the facsimile machine. A housing 2 includes two ports 4 for coupling the facsimile machine to a conventional telephone receiver. A glass plate 6 on the top surface of the housing supports a document to be copied, which is placed face down on the glass. Beneath the glass are a plurality of parallel guide tubes or rods 8, extending laterally across the housing for supporting a block 10 which is slideably mounted on the guide rods or tubes for lateral movement across the housing. As will be discussed in the section dealing specifically with the linear motor, a plurality of interspersed magnetic and non-magnetic inserts are mounted in a predetermined pattern throughout the length of each guide rod or tube 8 for driving a linear motor mounted thereon. The block 10 includes a linear motor, a scan head, and a print head, each of which will be discussed in greater detail below.

The block 10 and guide rods 8 are positioned within two parallel sidewalls or partitions 13 that extend in the direction of the guide rods. A film 15 extending laterally across the housing and parallel to the guide rods is also enclosed within the partitions 13. The rods and film are supported by end blocks 21 perpendicular thereto, and the end blocks are supported by the partition sidewalls, as illustrated in FIGS. 2 and 3.

The end of a sheet of paper 11 is shown extending from one end of the housing 2 through a suitable slot in that housing. Preferably, the paper is a black or darkened material having an aluminum coated upper surface. As is known in the facsimile machine art, an electric voltage applied to the aluminum coated surface of the paper, as for example, by a relatively thin electrical stylus in contact with the paper, will produce an electric arc. The arc melts a small portion of the aluminum surface to expose a corresponding portion of the black paper thereunder. The result is that a black dot appears. These black dots provide a copy of the written document to be reproduced.

Turning now to FIG. 2 of the drawings, it can be seen that the guide rods 8, the slideable block 10, and the film 15, are mounted in a generally rectangular frame designated by the reference numeral 12 including the two spaced, parallel sidewalls or partitions 13 shown in FIG. 1. As noted above, the block 10 is laterally movable on the guide rods between the sides of the housing 2. A conveyor system is provided to move the frame 12 longitudinally across the housing 2 beneath the glass cover 6.

Figure 7:
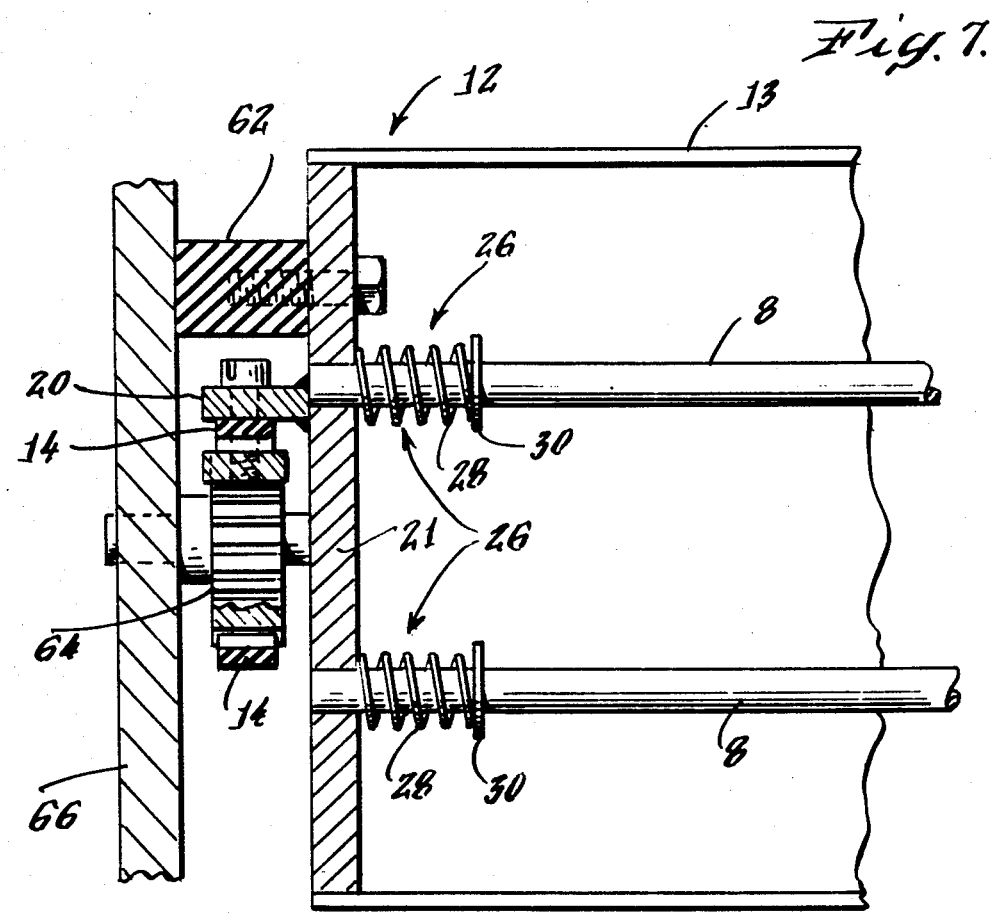
FIG. 7 is a sectional view of the machine taken along directional arrows 7—7 of FIG. 2.

The conveyor system includes two toothed side belts 14. The belts are driven by a stepping motor 16 positioned at the rear of the housing 2, and are also coupled around a lateral guide shaft 18 at the front of the housing. A gear drive system may be coupled to the motor 16. Two clamps 20 on each belt connect the ends of the frame 12 to the belts 14 so that the frame is longitudinally movable across the housing, at least for the length of the glass plate 6. As illustrated in FIGS. 3 and 7, lateral guides or spacers 62 are provided to separate the ends of the frame 12 from the inner sides of the housing 2 when the frame is moved within the housing. The frame 12 rides on wheels attached to the end blocks 21. The wheels ride on a track mounted to sides of the housing.

Accordingly, when the frame 12 is stationary and the block 10 is moved laterally along the guide rods 8, a print head mounted to the lower portion of the block 10 engages the paper 11 thereunder to print a line of information. When the line is completed, the frame 12 is advanced a predetermined distance to the right in FIG. 2 by the conveyor system, and the block 10 continues moving laterally to print another line.

As noted above, the laterally moving block 10 is driven by a linear motor and includes an electric print head mounted beneath the motor and a scan head mounted above the motor. The motor, print head and scan head will be discussed in greater detail below. However, FIG. 2 does generally illustrate an electrical connector 22 movable with the block 10, and an attached electrical cable 24, for powering the linear motor, print head, and scan head.

FIG. 2 further illustrates bumpers or shock absorbers 26 provided at the ends of the respective lateral guide rods 8 to cushion the impact of the block 10, including the linear motor, against the ends of the frame 12. Each bumper is formed from a coil spring 28 mounted around the end of a guide rod. One end of each spring is coupled to the adjacent end of the frame 12, while the other end is coupled to a stop 30 which, for example, may be a ring mounted around the respective guide rod. The stop may also be defined by integrally extending the spring itself. FIG. 7 illustrates the shock absorbers in greater detail.

The block 10 will now be discussed in greater detail in connection with the following discussion of FIGS. 3, 4 and 5. Referring first to FIG. 5, the block 10 carries a linear motor including three electrical coils 32, 34 and 36. Each coil is mounted through its central opening, on a different one of three guide rods 8. As will be discussed in detail in the section specifically describing the linear motor, means are provided to selectively energize and de-energize the three electrical coils to move the linear motor laterally along the guide rods. Although three coils mounted to three separate guide rods are illustrated in the drawings, different numbers of coils and guide rods are equally feasible. Moreover, several coils can be mounted on the same guide rod, so that the number of coils does not necessarily have to correspond to the number of guide rods.

A scan head, shown generally as reference numeral 38, is mounted to the top of the linear motor. The scan head includes two light sources 40 mounted on a supporting block 41. The light sources direct light at an angle towards the lower surface of the glass plate 6. A generally cylindrical aperture 42 in the block 41, is disposed between the two light sources 40. A plurality of photodetectors, preferably phototransistors 49 (FIG. 5A) are mounted under a window 51 in the end of cylindrical can 45 seated within aperture 42. A lens 43, mounted atop the aperture 42, focuses light from the sources 40, which is reflected back towards the scan head by information on a document on the glass cover 6, to the phototransistors 49 in the cylindrical can 45. Electrical leads (not shown) transmit signals generated by the phototransistors in response to the reflected light. Spacers 44 are disposed between the top surface of the scan head and the lower surface of the glass 6 to provide separation between these elements when the scan head moves relative to the glass when driven by the linear motor. Springs 46 act on the lower surface of the block 41 to maintain the spacers at the top of the scan head flush against the glass 6.

A print head, shown generally by the reference numeral 48, is attached to the lower portion of the linear motor and extends below it. Electrical wires 50 connect the print head to a power supply for electrical energization thereof. The print head itself includes an upper supporting member 52 fixedly mounted to the lower portion of the block 10, and a lower electrical stylus 54 removably mounted within the upper supporting member. As will be discussed in the section specifically describing the print head, the stylus includes a plurality of electrically conductive wires, the ends of these wires engaging the printing surface of the aluminum coated paper 11. When the print head is energized, information is printed on the paper 11. For example, the aluminized paper 11 may be grounded, and a voltage may be applied to the paper through the stylus wires, thereby causing an electrical arc and printing a dot, as was previously discussed. In the alternative, a voltage may be applied to the aluminized printing surface, and the stylus may be selectively grounded thereby causing an electrical arc and printing a dot. In either case, actuation of the stylus causes the printing of a dot corresponding to information on documents to be reproduced.

The film 15 extending laterally across the housing 2 (see FIG. 1) is illustrated in FIG. 5. As shown, two light sources 56 are disposed on one side of the film, while two corresponding light detectors are disposed in alignment with the light sources on the opposite side of the film 15. The light sources 56 and the corresponding light detectors 58 are movable with the linear motor, print head, and scan head on the block 10, while the film 15 is mounted stationary in the housing 2, as illustrated in FIG. 1.

Figure 6:
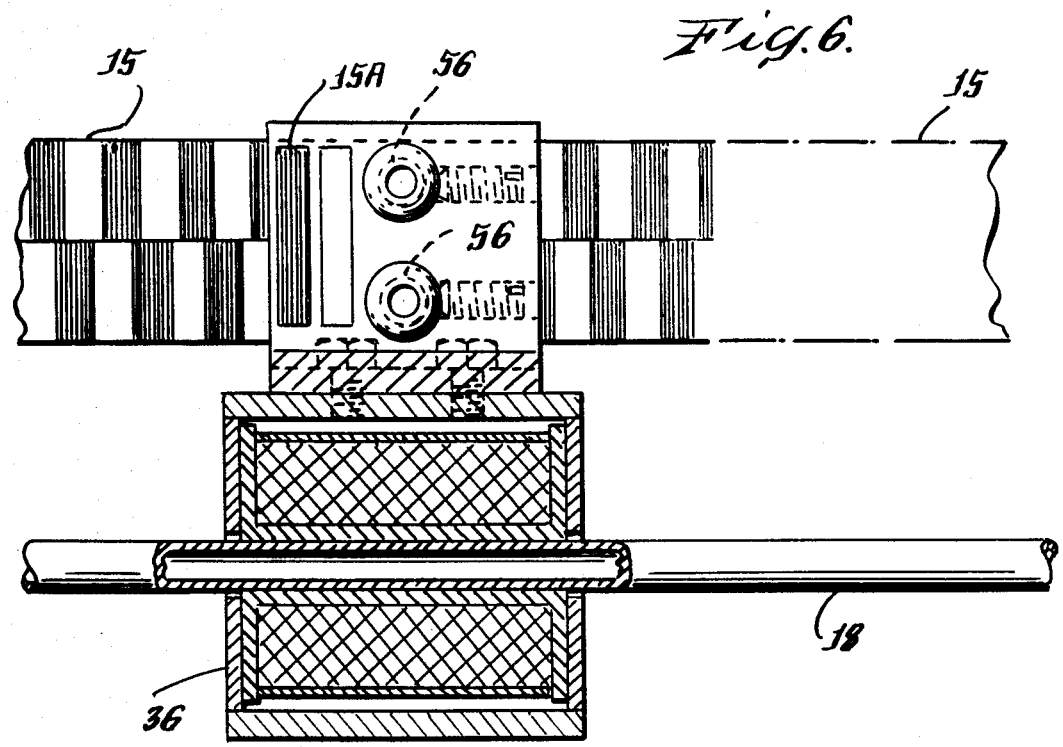
FIG. 6 is a sectional view taken along directional arrows 6—6 of FIG. 5.

The sources 56, the detectors 58 and the film 15 comprise a timing fence, as will be discussed below, for controlling the spacing of printing on the paper 11, for controlling the positions at which the scan head reads a document to be copied from the glass 6, and for controlling the actuation of the linear motor. The film 15 includes a clear sheet of material having a plurality of tick marks or darkened spots applied at predetermined spaced intervals along the length of the film. Preferably, each mark is spaced 0.014 inch apart from the next mark, and two sets of marks offset from each other by 90° are provided on the film, as illustrated by FIG. 6. The marking pattern shown in FIG. 6 is known in the art as QUADRATURE. A second strip of film 15A is attached to the light sources and is movable with the block 10 so that motion is detected by the moiré effect.

FIG. 7 illustrates in greater detail the lateral spacers shown generally as reference numeral 62 in FIG. 3 and the shock absorbers 26, previously discussed with respect to FIG. 2. The spacers include a spacing element or lateral guide 62 affixed to the end blocks 21 of the frame 12. As the frame 12 is moved within the housing 2, the lateral guide 62 moves along an end 66 of the housing 2. The spacers assure at least a predetermined clearance between the frame end blocks 21 and the housing end 66 to facilitate movement of the frame relative to the housing as discussed whith respect to FIG. 2. FIG. 7 also illustrates a gear wheel 64 which engages the toothed side belts 14 for moving the frame 12 relative to the ends 66 of the machine housing 2. As discussed above, the wheels on the end blocks 21 engage trackes defined on the sides 66 of the housing 2 to provide the relative movement.

In operation of the facsimile machine, the linear motor is energized to drive the block 10 along the lateral guide rods 8. (The operation of the linear motor itself will be discussed separately below.) The light sources on the scan head are directed towards a document on the upper glass cover to be reproduced. Information on the document reflects the light through the lens 43 towards the phototransistors in the scan head, and the phototransistors generate an information signal. Each phototransistor monitors a different area in the field of view of the portion of the document being scanned. As the linear motor traverses the lateral guide rods 8, the light sources and photodetectors 56 and 58 of the timing fence (FIG. 5) move along the stationary film 15. As the sources pass the darkened spots or tick marks on the film, the light from the source is not sensed by its respective detector. A corresponding signal is generated by the timing fence.

Figure 7A:
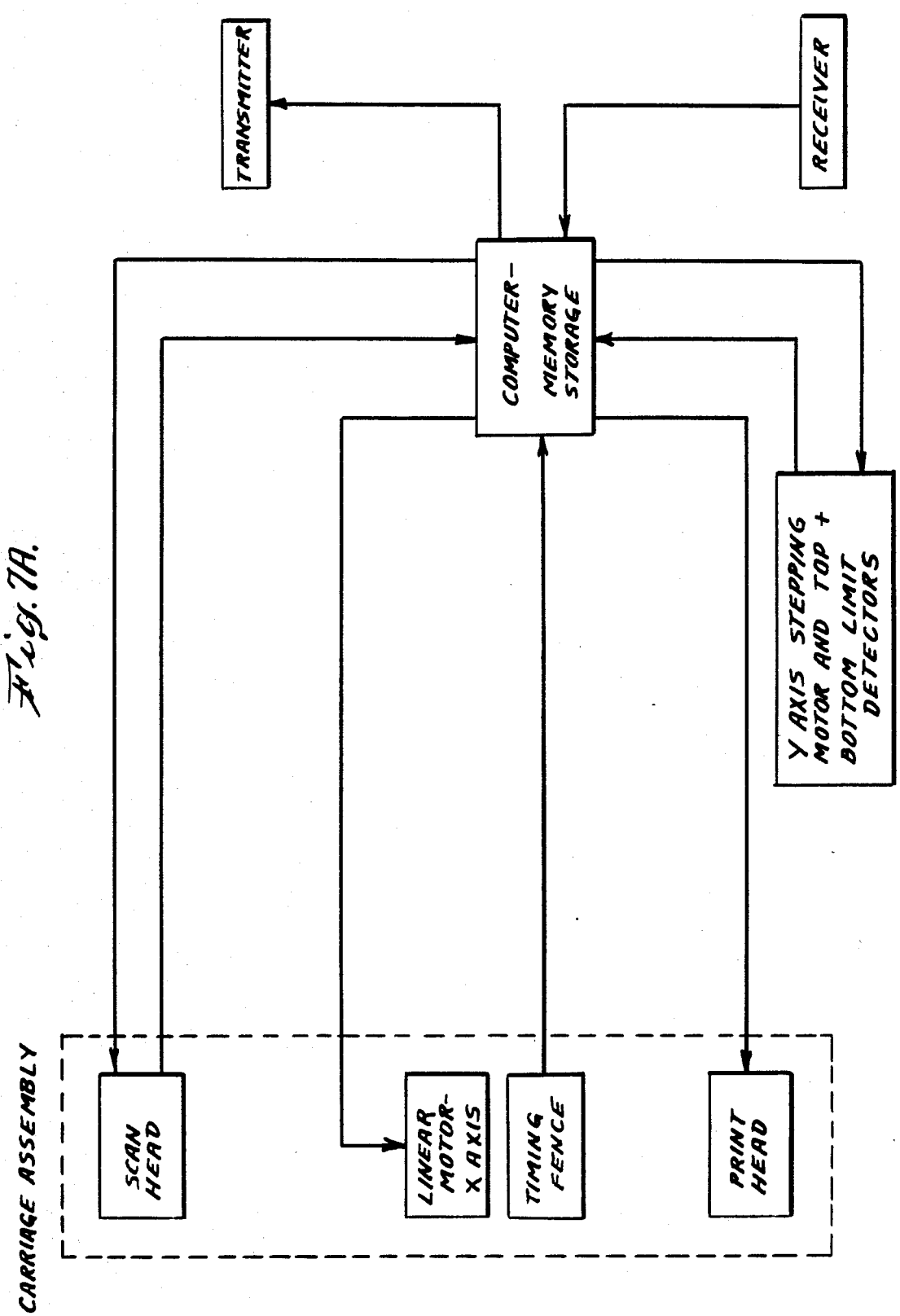
FIG. 7A is a block diagram of the control system of the facsimile machine.

The signals generated by the detection of information and by the timing fence, as described above, are transmitted to a memory storage device as shown in FIG. 7A. In the preferred embodiment of the invention, the memory is provided by a microcomputer. The information signals generated by the phototransistors 49 are transmitted to the memory storage device by phototransistor electrical leads.

FIG. 7A is a block diagram illustrating the control circuitry of the facsimile machine discussed herein. As discussed above, the tick marks on the film 15 are spaced apart from each other by a predetermined distance. A signal generated by the timing fence (when its sources and detectors pass a tick mark on the film 15) is transmitted to a memory storage device, which samples a signal from the scan head. The scan head is energized and scans the information on a document (on glass 6) within its field of view. The information is transmitted back to the memory storage with appropriate signals for indicating the beginning and end of each line of information scanned.

A signal from the timing fence to the memory storage also generates a second signal from the memory storage device to the print head, resulting in the printing of information previously read by the scan head and already stored in the memory. Because signals from the timing fence are only generated at predetermined intervals, information printed by the print head will be spaced apart a distance corresponding to the predetermined intervals.

A third signal is transmitted from the memory storage to the linear motor when the memory storage receives a signal from the timing fence. This third signal is used to drive the motor, as will be more fully discussed in the section describing the motor.

The memory storage is also coupled to the stepping motor 16 (FIG. 2) to control the movement of the carriage assembly relative to the printing surface to assure that the print head only prints information within a predetermined vertical range (Y axis) on the printing surface.

Accordingly, the timing fence assures that the scan head will scan information at predetermined distance intervals, that the printer will print information spaced apart at predetermined distance intervals, and that components of the linear motor will be activated or deactivated only at predetermined positions on the guide rods supporting the motor. The timing fence continually monitors the position of the motor relative to the guide rods, and transmits this information to the memory.

It is apparent that the use of the timing fence eliminates the need for a complex timing system, dependent on the speed of the linear motor. That is, the scanning and printing operations are dependent only on the position of the linear motor as detected by the timing fence, and are not dependent on the speed of that motor. To the contrary, a system dependent on motor speed requires complex means for compensating for variations in motor speed.

The facsimile machine of the present invention may also be used as a receiver or transmitter for a telecopier machine in addition to its use as a photocopier as described above. When transmitting information, a document is scanned, as discussed above, and information is transmitted to the memory storage. However, the information is subsequently provided to a transmitter for transmission over telephone lines. Although not necessary, if it is desired, the transmitted information may also be printed at the transmitting unit in the manner described above.

A receiver is provided for receiving transmitted information from a remote transmitter when the facsimile machine is operating as a telecopier receiver. Information received at the receiver is transmitted to the memory storage device, and thereafter printed as described above. When in use as a telecopier receiver, the scanning operation of the facsimile machine is unnecessary.

Accordingly, the present facsimile machine is a multi-purpose apparatus which can be used selectively as a photocopier of documents, a telecopier machine transmitter, or a telecopier machine receiver. When used as a telecopier machine, the device advantageously eliminates the need for mechanical synchronization between transmitting and receiving units. As a receiver, the machine stores received information in a memory storage. The information can be printed thereafter. There is no need to print the information simultaneously as it is received, as is done in many known telecopier machines. Likewise, information to be transmitted is first stored in the memory storage device. It may thereafter be transmitted to a remote receiver. However, there is no requirement that the information be transmitted simultaneously with the scanning of a document to be copied.

The present invention further contemplates a method of simultaneous voice and data transmission when the facsimile machine is used as a telecopier machine. A standard telephone line provides a frequency range of 50-3000 Hz. By transmitting all data information in a band range of 2000-3000 Hz, while transmitting all voice signals in a band range of 50-1900 Hz, simultaneous data and voice transmissions over the same telephone line is possible. Conventional filters may be used to assure that the data and voice signals are within their separate bands. The use of simultaneous voice and data transmission provides a significant convenience to the user.

In summary, the facsimile machine of the present invention provides a multi-purpose apparatus which may be used, at the selection of the user, as a photocopier, or a telecopier receiver or transmitter. The apparatus includes means for eliminating the need to synchronize telecopier receivers and transmitters, and further provides simultaneous voice and data transmission. Moreover, a photoelectric system dependent on the position of the motor, and independent of motor speed, assures that the machine will scan at predetermined locations within the machine and all printed information will be printed at predetermined intervals, regardless of motor speed.

LINEAR MOTOR

The operation of the linear motor of the present invention will now be discussed with reference to FIGS. 8 and 9 of the drawings. As discussed above, the linear motor may be used to drive the print head of the facsimile machine in both directions of traverse across a printing surface. When used in this manner, the linear motor is supported by guide members 8, shown in FIGS. 1-7, which may be either rods or tubes.

The linear motor, shown generally as part of block 10 in FIGS. 1, 3 and 4, includes a plurality of electrical coils 32, 34 and 36 mounted on bobbins in a motor housing. Preferably, the bobbins are attached to the housing with steel brackets. The housing itself is mounted on the plurality of lateral guide rods or tubes 8 above a printing surface and extending in the same direction as that surface. The housing is supported by the bobbins riding on the rods or tubes 8. A print head 52 (FIGS. 4 and 5) mounted under the linear motor is driven by the motor laterally along the guide members 8 so that the printing stylus 54 of the print head contacts the printing surface 11.

FIG. 8 diagrammatically illustrates the arrangement of the guide members and coils of the motor used in the embodiment of the invention discussed in FIGS. 1-7. The motor housing is mounted on three guide rods 8 such that each of three electrical coils 32, 34 and 36 is positioned on a different one of the guide rods.

Magnetic material or inserts 68 and non-magnetic spacers 70 are mounted to the guide rods or tubes 8 throughout their entire length. The magnetic inserts may be, for example, iron slugs while the spacers may be aluminum slugs. Means are provided to selectively electrically energize and de-energize the individual coils mounted to the guide members 8, thereby providing a magnetic interaction between an energized coil and one of the magnetic areas on the guide member supporting the respective coil. Actuating an electrical coil as the coil approaches a magnetic area or strip on its guide member will result in a magnetic attraction advancing the coil towards the center of the magnetic area. The electrical coil and magnetic insert act as a solenoid in reverse. Thereafter, that coil may be de-energized and another coil energized such that the other coil will advance, as a result of magnetic interaction, towards the center of the next forward magnetic area on its respective guide member. By selectively energizing and de-energizing the individual electrical coils in dependence upon their position relative to the magnetic areas on the respective guide members, the motor housing (and the print head and scan head carried thereby), are advanced laterally across the housing 2 from one end of the guide members to the other. By reversing the phase pattern applied to the coils, the motor can be returned to its initial starting position at the other end of the guide members 8.

In effect, the coils of the linear motor and the magnetic inserts on the guide members act as solenoids in reverse. Preferably, the length of the magnetic areas defined on the guide members will be two times the active lengths of the coil mounted to the respective guide member. Also, it is preferable that the length of the non-magnetic areas be slightly less than the length of the motor housing so that at least one coil will be adjacent to a magnetic area at any point along the guide member. By conforming the length of the non-magnetic spacers to the above requirement, start-up of the motor is guaranteed at any position on the lateral guide members.

Energization and de-energization of the coils may be accomplished by use of any of several conventional means. For example, a photodetection system can be used to provide signals to actuate or deactuate coils as they traverse certain predetermined positions on the guide members. In the alternative, a computer may be programmed to actuate and deactuate the coils at the proper respective locations on the guide members.

When the linear motor is used to drive the print head and scan head of the facsimile machine described herein, the selective energization and de-energization of the coils 32, 34 and 36 necessary to drive the coils across the lateral guide members 8 may be provided by the microcomputer device shown in FIG. 7A. As discussed above, signals from the timing fence transmitted to the microcomputer device indicate the position of the linear motor relative to the guide members. The memory may be programmed to provide signals for actuating and deactuating the proper coils at the proper positions on the guide members to provide the necessary linear motion.

FIG. 9 illustrates a second possible arrangement of the linear motor incorporating two guide members 8 and three coils, 32, 34 and 36, two of which are mounted apart from each other on the same guide member. As discussed above, the motor linearly traverses the guide members by selectively energizing and de-energizing the individual coils depending on their respective positions relative to the magnetic areas of their respective guide members.

It is apparent that the linear motor described above includes only a minimal amount of moving parts, does not require permanent magnets, and thus can be produced inexpensively. The guide members serve a dual function, both supporting and guiding the motor, and also driving the motor. The motor is efficient and converts electric energy into translational motion via a magnetic interaction.

The arrangements of the linear motor illustrated in FIGS. 8 and 9 are illustrative only since numerous other variations and arrangements using the basic principles described herein are possible. Moreover, the linear motor may be used in addition to driving the print head and scan head of the facsimile machine described herein, in a wide variety of applications such as with standard printers, photocopiers, typewriters and other apparatus in which linear motors are required. That is, the linear motor is not limited to use in the specific facsimile machine described herein.

PRINT HEAD

FIGS. 10–14 illustrate a method of manufacturing a print head of the type used in the facsimile machine of the present invention. The print head is also suitable for various other printing operations not necessarily connected with the facsimile machine. As already discussed herein, electrical energization of the print head melts a portion of an aluminum coating on a printing surface to expose or print a dot.

As illustrated in FIG. 10, three thin electrically conductive wires 72, 74 and 76, are stretched tightly across a jig or rack generally designated by reference numeral 78. One end of each of the three wires is clamped to the jig, while a weight 80 is attached to the other ends of the wires extending beyond the jig. The weight keeps the wires stretched tightly across the jig. Preferably, the wires are each formed from tungsten and are each approximately in the range of 2–10 mils in diameter, preferably about 5 mils.

A first hollow glass cylinder or tube 82 includes three smaller hollow glass cylinders or capillary tubes 84, 86 and 88 removably received therein. Each of the three wires 72, 74 and 76 is threaded through a different one of the smaller glass tubes, and the larger cylinder 82 is slid over the three smaller tubes before the weight 80 is attached to the wire ends. The three smaller tubes initially are slideable along their respective wires, and the larger and smaller tubes are positioned towards one end of the jig as shown in FIG. 10. The exposed portions of the wires 72, 74 and 76 are then annealed and oxidized by continuously heating them with a torch 90.

Once the wires have been annealed, each smaller tube 84, 86 and 88 is slid out of the larger tube 82 and positioned on the exposed portion of its respective wire, as illustrated in FIG. 11. The smaller tubes are then individually heat fused by the torch 90 to the respective wires. Thereafter, as shown in FIG. 12, the larger glass tube 82 is slid along the three wires and over the three smaller tubes, each of which already has been fused to a different one of wires 72, 74 and 76. The larger tube 82 is then itself heat fused to the outer surfaces of the smaller tubes by the torch 90.

The weight 80 attached to the ends of the three wires 72, 74 and 76 is removed, while the other ends of the wires are unclamped from the jig 78. Thereafter, the fused tube is cut or sawed in half at its approximate longitudinal center by a saw 92 as illustrated in FIG. 13, and the cut end surfaces of that tube are polished.

FIG. 14 is a sectional view through one of the cut halves of the larger glass tube 82. Each half includes the three smaller tubes 84, 86 and 88 embedded or encapsulated in the larger tube 82. The individual wires 72, 74 and 76 are themselves each encapsulated in a different one of their respective smaller tubes.

The process described above results in the production of two separate encapsulated, solid rod or block print heads since each half of the cut larger tube 82 can be used as a print head. The ends of the wires extending from the far ends of each cut half (FIG. 13) may be coupled to a suitable electric source, while the wire ends terminating at the cut surfaces contact a printing surface to print information thereon.

When the print head is used with the facsimile machine illustrated in FIGS. 1–7A, the wires extending from the far ends of the encapsulated block are coupled to the microcomputer of FIG. 7A. The computer controls the energization of each wire to control the printing of dots on printing surface 11. Each wire of the stylus corresponds to the field of view scanned by one phototransistor 49. Printing of dots by the stylus of the print head is controlled by the microcomputer device in response to information signals received from the scan head, as already discussed.

Preferably, the diameters of the smaller tubes are each about 0.01" and the diameter of the larger tube is about 0.1". In this manner, the surface area of the three 5 mil wire ends is only approximately 15% of the sectional surface area of the entire encapsulated print head. Although the print head produced from the process described above includes three wires, a print head having any number of wires may be formed similarly from the same procedure.

The encapsulated, solid block print head, as illustrated in FIGS. 13 and 14, incorporates several advantages over known print heads which generally use free-standing wires. By encapsulating the wires of the print head, these wires are reinforced and strengthened. Accordingly, the wires may be formed from very small diameter, fine conductive material such as 5 mil diameter tungsten, thereby providing finer resolution of the printed information. To the contrary, free-standing wires must be self-supporting and thereby are formed from relatively thick, durable conductors. Increasing the thickness of the wires correspondingly decreases the fineness of the resolution of the printed information.

Further, by encapsulating the wires of the print head, wear and tear on the wires is decreased, thereby extending the useful life of the print head.

Moreover, the end of the print head may be substantially perpendicular to the printing surface, which is not possible with a free-standing wire. A free-standing wire tends to be bent or angled at the end of the wire contacting the printing surface. Therefore, print heads including free-standing wires generally print only in one direction of movement; namely, in the direction of the bend at the end of the wire. Such print heads are removed from contact with the printing surface on the return to its starting position because printing against the bend in the wire might cause the wire to tear the printing surface. However, by encapsulating the wire in a supporting structure with only a relatively small portion of the wire end extending from the printing end of the print head, the print head and wire may be maintained substantially perpendicular to the printing surface without any resultant bending of the wire. Therefore, the print head may be used to print in both directions, without damaging the printing surface.

As previously mentioned, the surface area of the encapsulated wire ends is only a relatively small percentage of the total cross-sectional area of the larger tube 82 (FIG. 14). Therefore, any force exerted on the print head to maintain it in contact with the printing surface is not applied only to the wires, but distribution of the force over the cross-sectional area of the larger tube reduces the stress on the wires, thereby increasing their useful life. To the contrary, in a print head formed from free-standing wires, all of the force on the print head is applied to only the wires, thereby keeping the wires under continual stress. This stress reduces the useful life of the wires. Moreover, free-standing wire heads leave scratch marks on paper due to the high pressure at the point of contact between the paper and the wire. Encapsulated wires do not scratch the paper.

Although in the above discussion of the print head and stylus the larger and smaller encapsulating tubes are formed from glass, any other non-electrically conductive material may also be used for the tubes. However, glass is preferable due to its hardness and long life.

Although the method described above utilizes the same number of smaller encapsulating tubes as the number of wires, it is possible to use two less tubes than wires. For example, only the central wire 74 of FIGS. 10-14 need be encapsulated by a non-conductive tube 86 in order to electrically insulate each of the wires 72, 74 and 76 from each other.

While the method of forming the print head discussed above is preferred, the encapsulated print head may be formed in other ways. For example, ribbons of tungsten may be placed on flat sheets of glass or other non-conductive supporting material and fused or glued thereto. Also, glass or plastic may be injection or blow molded around tungsten wires to form an encapsulated print head.

In summary, the encapsulated, solid block print head (FIG. 14) formed from the method illustrated in FIGS. 10-13 advantageously increases the useful life of the printing wires, enables the print head to print in both directions of traverse, allows the use of relatively small diameter wires to increase the fineness of the resolution of the printed information, and does not scratch the printing surface. The print head described herein is useful in many different types of printing applications, as for example, in the facsimile machine discussed above, or computer terminal printers, medical instruments, chart recorders, X-Y recorders, ticket printers, and similar electrostatic printing operations.

I claim:

1. An apparatus for duplicating information comprising:

storage means for storing signals corresponding to information to be duplicated, means for generating signals corresponding to information recorded on a recording medium, said generating means comprising one or more photodetectors and means for moving said photodetector(s) back and forth across said recording medium, said generating means being coupled at its output to said storage means for supplying said signals to said storage means, a receiver comprising means for receiving voice signals in a frequency band of 50-1900 Hz and means for receiving data signals in a frequency band of 2000-3000 Hz, said receiver being adapted to be coupled at its input to a telecommunication line for receiving signals from said telecommunication line, said receiver being coupled at an output to said storage means for supplying to said storage means signals representative of the data signals received by said receiver, a transmitter comprising means for transmitting voice signals in a frequency band of 50-1900 Hz and means for transmitting data signals in a frequency band of 2000-3000 Hz, said transmitter having an input coupled to said storage means for supplying data signals in said storage means to said transmitter, said transmitter being coupled at an output to said telecommunication line for transmitting said voice and data signals through said telecommunication line, and a printer operatively associated with said storage means and movable with said photodetector(s) for printing information represented by the signals stored in said storage means, whereby the printer provides either a copy of the information recorded on the recording medium or a copy of the information received by said receiver.

2. The apparatus of claim 1 further comprising means for filtering voice signals outside the range of 50-1900 Hz operatively associated with said means for transmitting voice signals and means for filtering data signals outside the range of 2000-3000 Hz operatively associated with said means for transmitting data signals.

3. An apparatus for duplicating information comprising:

storage means at a first location for storing signals corresponding to information to be duplicated, means at said first location for generating signals corresponding to information recorded on a recording medium, said generating means comprising one or more photodetectors and means for moving said photodetector(s) back and forth across said recording medium, said generating means being coupled at its output to said storage means for supplying said signals to said storage means, a receiver at said first location comprising means for receiving voice signals in a frequency band of 50-1900 Hz and means for receiving data signals in a frequency band of 2000-3000 Hz, said receiver being adapted to be coupled at its input to said telecommunication line for receiving signals from said telecommunication line, said receiver being coupled at an output to said storage means for supplying to said storage means signals representative of the data signals received by said receiver, a transmitter at said first location comprising means for transmitting voice signals in a frequency band of 50–1900 Hz and means for transmitting data signals in a frequency band of 2000–3000 Hz, said transmitter having an input coupled to said storage means for supplying data signals in said storage means to said transmitter, said transmitter being coupled at an output to said telecommunication line for transmitting said voice and data signals through said telecommunication line, a printer at said first location operatively associated with said storage means and movable with said photodetector(s) for printing information represented by the signals stored in said storage means, storage means at a second location for storing signals corresponding to information to be duplicated, means at a second location for generating signals corresponding to information recorded on a recording medium, said generating means comprising one or more photodetectors and means for moving said photodetector(s) back and forth across said recording medium, said generating means being coupled at its output to said storage means for supplying said signals to said storage means, a receiver at said second location comprising means for receiving voice signals in a frequency band of 50–1900 Hz and means for receiving data signals in a frequency band of 2000–3000 Hz, said receiver being adapted to be coupled at its input to said telecommunication line for receiving signals from said telecommunication line, said receiver being coupled at an output to said storage means for supplying to said storage means signals representative of the data signals received by said receiver, a transmitter at said second location comprising means for transmitting voice signals in a frequency band of 50–1900 Hz and means for transmitting data signals in a frequency band of 2000–3000 Hz, said transmitter having an input coupled to said storage means for supplying data signals in said storage means to said transmitter, said transmitter being coupled at an output to said telecommunication line for transmitting voice and data signals through said telecommunication line, and a printer at said second location operatively associated with said storage means and movable with said photodetector(s) for printing information represented by the signals stored in said storage means, whereby the printer provides either a copy of the information recorded on the recording medium at said second location or a copy of the information received by said receiver from said telecommunication line.

4. The apparatus of claim 3 further comprising means for filtering voice signals outside the range of 50–1900 Hz operatively associated with said means for transmitting voice signals and means for filtering data signals outside the range of 2000–3000 Hz operatively associated with said means for transmitting data signals.

* * * * *